US006348256B1

(12) United States Patent
Rabasco et al.

(10) Patent No.: US 6,348,256 B1
(45) Date of Patent: Feb. 19, 2002

(54) INK JET PAPER COATINGS CONTAINING AMINE FUNCTIONAL MONOMER GRAFTED POLY(VINYL ALCOHOL)

(75) Inventors: John Joseph Rabasco, Macungie; Eric Howard Klingenberg, Emmaus; John Richard Boylan, Bethlehem, all of PA (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 09/162,940

(22) Filed: Sep. 29, 1998

(51) Int. Cl.[7] .............................................. B32B 27/30
(52) U.S. Cl. ........................ 428/195; 428/500; 428/522
(58) Field of Search ................................ 428/195, 211, 428/332, 334, 335, 336, 409, 483, 500, 520, 522

(56) References Cited

U.S. PATENT DOCUMENTS

| | | | | |
|---|---|---|---|---|
| 4,801,497 A | * 1/1989 | Kono et al. | | 428/332 |
| 5,270,103 A | 12/1993 | Oliver et al. | | 428/219 |
| 5,570,120 A | * 10/1996 | Sakaki et al. | | 347/105 |

FOREIGN PATENT DOCUMENTS

| | | | |
|---|---|---|---|
| JP | 55125109 | 9/1980 | C08F/20/34 |
| JP | 58186696 | 10/1983 | D21H/3/44 |
| JP | 61134291 | 6/1986 | B41M/5/00 |
| JP | 61230979 | 10/1986 | B41M/5/00 |
| JP | 63149183 | 6/1988 | B41M/5/00 |
| JP | 63162276 | 7/1988 | B41M/5/00 |
| JP | 5278322 | 10/1993 | B41M/5/00 |
| JP | 5278323 | 10/1993 | B41M/5/00 |

* cited by examiner

*Primary Examiner*—Bruce H. Hess
*Assistant Examiner*—Michael E. Grendzynski
(74) *Attorney, Agent, or Firm*—Mary E. Bongiorno; M. Susan Spiering

(57) ABSTRACT

Improved ink jet paper coatings which impart high optical density images and excellent water resistance to paper and a process for making an improved ink jet recording paper. The coating formulation comprises an inorganic pigment, preferably silica, and an amine modified poly(vinyl alcohol) composition in which the poly(vinyl alcohol) is graft polymerized with an ethylenically unsaturated monomers containing primary, secondary, tertiary, or quaternary amine functionality.

14 Claims, No Drawings

INK JET PAPER COATINGS CONTAINING AMINE FUNCTIONAL MONOMER GRAFTED POLY(VINYL ALCOHOL)

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Advances in ink jet technology have placed increased demands on recording papers. To function properly, the recording paper must quickly absorb the ink and ink vehicles directly after printing, maximize the ink optical density, minimize bleeding and wicking of the ink, and provide good water and light fastness. To obtain a paper with the above functions, the paper is usually treated with one or more coatings.

Ink jet paper coatings typically comprise silica pigment for its high absorption power and a polymeric binder, such as poly(vinyl alcohol), for its high binding strength. Non-silica pigments, such as clays, calcium carbonate, titanium dioxide, and aluminum hydrate, are also used. Other known polymeric binders include poly(vinylpyrrolidone), styrene-butadiene copolymers, poly(vinyl acetate), starch, and amine functional polymers such as amine functional poly (vinyl alcohol).

Amine functional poly(vinyl alcohol) is typically produced by the copolymerization of vinyl acetate with amine functional monomers, such as trimethyl-(3-methacrylamido-propyl) ammonium chloride, N-vinylformamide, or acrylamide, followed by saponification to form the poly (vinyl alcohol) derivative. However, there are disadvantages to this approach. The selection of amino comonomers is very limited due to their incompatibility with the saponification conditions to produce poly(vinyl alcohol). Depending on the monomer which is copolymerized with the vinyl acetate, saponification can have a deleterious effect on the comonomer. For example, when 2-(dimethylamino)ethyl methacrylate (DMAEMA) is the comonomer, saponification results in hydrolysis of the ester bond, thus removing the active amine functionality from the polymer backbone. Another disadvantage which limits the number of comonomers that can be used for the preparation of amine functional poly(vinyl alcohol) is the reactivity ratio of the comonomer with vinyl acetate. Depending on these reactivity ratios, there can be severe limitations not only on the level of amine monomer incorporation into the vinyl acetate copolymer, but also on the attainable range of copolymer molecular weights.

Another approach to producing amine functional poly (vinyl alcohol) involves post-reacting poly(vinyl alcohol) with amino synthons, such as aminobutyraldehyde dimethyl acetal (ABAA) or free radical graft copolymerization with monomers, such as 2-(dimethylamino)ethyl methacrylate (DMAEMA). Graft copolymerizing amine functional monomers with poly(vinyl alcohol) provides some advantages over the traditional copolymerization with vinyl acetate and subsequent saponification. For example, by using poly(vinyl alcohol) as a reactive synthon to graft polymerize other monomers, the saponification step is circumvented, thereby allowing the use of a much larger number of amine functional monomers and access to a wider range of amine functional poly(vinyl alcohol) compositions. Furthermore, issues that can arise from the monomer reactivity ratios is avoided making it much easier to control the amount of amine functionality introduced on the poly(vinyl alcohol) backbone via a grafted chain. Another advantage of graft polymerizing amine functional monomers onto poly(vinyl alcohol) versus copolymerization with vinyl acetate followed by saponification is the formation of a very different polymer structure. The amine functional poly(vinyl alcohol) produced via copolymerization with vinyl acetate and saponification affords a copolymer with the amine monomer incorporated into the polymer backbone, which can hinder and mask the activity of the amine in some applications. However, the grafted poly(vinyl alcohol) copolymer can contain long chains of polyamine off the poly(vinyl alcohol) backbone which enhances the activity of the amine functionality, since it is more accessible, and provides for a much better balance of properties of the polyamine versus the poly(vinyl alcohol). One potential drawback in graft polymerization reactions is the simultaneous production of homopolymer or copolymers of the monomers being grafted to the poly(vinyl alcohol), ultimately resulting in a blend of polymers.

Most of the commercially available amine functional homo- and copolymers and amine functional poly(vinyl alcohol)s are economically unattractive. The commercially available amine functional poly(vinyl alcohol)s, in addition to being costly, also suffer from low levels of amine functionality. As a result of the low levels of amine functionality, these materials fail to meet the stringent performance requirements for good ink jet print quality, especially for the high-end, photographic grade ink jet papers. The printed image density and sharpness are inadequate, as is the water and light resistance. There has, therefore, been a continuing need to produce a higher performing polymeric system that will provide good printed image density and sharpness as well as water and light resistance.

Much of the prior art addresses these performance issues by blending various synthetic amine containing polymers or copolymers into ink jet coating formulations. The ratios of amine containing polymers or copolymers, poly(vinyl alcohol) binder, pigment, and other additives, are then varied to achieve the desired final ink jet paper properties. However, compatibility problems can arise using such blends. For example: 1) when the ink jet coating formulation is prepared and blended together, phase separation, thickening, and/or flocculation can occur resulting in an uncoatable system; 2) the blended polymer system can be incompatible with other reagents which are often used in ink jet coating formulations; and 3) once the paper is coated and dried the incompatibility of the blends can result in a heterogeneous coating surface, which translates into varying degrees of image quality once printed.

Representative examples of polymers containing amine functionality for use in ink jet paper coating and other paper applications are described below:

JP58 186696 (1983) discloses an internal agent used in papermaking comprising a cationated poly(vinyl alcohol) which is produced by graft copolymerization of poly(vinyl alcohol) with an aminoalkyl methacrylate or aminoalkyl acrylate, especially dimethylaminoethyl methacrylate and 3-trimethyl-2-hydroxypropyl methacrylate ammonium chloride. The internal agent is reported to provide filler retention yield, paper strength, and sizing in neutral paper.

JP55 125109 (1980) discloses a water soluble high molecular weight composite material which is obtained by polymerizing water soluble ethylene type unsaturated monomers, such as alkylaminoalkyl acrylates or methacrylates, in the presence of a high molecular weight compound, such as starch, poly(ethylene glycol), and poly (vinyl alcohol), having at least one of the following functional groups: ether, hydroxy, and carboxy. The composite material is reported to exhibit good stability and fluidity and to be useful in a variety of areas; e.g., as a dye, paper-treating agent, and viscosity increasing agent.

JP 93 67432 (1993) (abstract) discloses an ink jet recording paper containing a formulation consisting of a copolymer of vinyl alcohol with a cationic monomer such as trimethyl-3-(1-acrylamidopropyl)ammonium chloride and non-colloidal silica powder.

JP 61 230979 (1986) (abstract) discloses an ink jet recording paper having a coated layer containing synthetic amorphous silica and a water soluble polymer binder, preferably, cation-modified poly(vinyl alcohol).

JP 63-149183 (1988) discloses an ink jet recording sheet suitable for high speed recording and multi-color recording. The sheet has an absorption layer containing a graft polymer which is 10 to 60 wt % poly(vinyl alcohol) and 40 to 90 wt % of specified unsaturated compounds, such as acrylamide, methacrylamide, acrylonitrile, and acrylic and methacrylic esters.

JP 63 162276 (1988) (abstract) discloses a silica previously treated with a water-soluble resin which is contained on or in a surface to be recorded. The water-soluble resin is poly(vinyl alcohol), albumin, gelatin, casein, etc.

JP 5-278322 (1993) discloses a recording sheet with good ink absorptivity, image quality, and water resistance which has a recording layer in which the principal components are a quaternary ammonium salt polymer, a cation modified poly(vinyl alcohol), and a hydroxyl group crosslinkable compound. The quaternary ammonium salt polymer has at least one quaternary ammonium salt in its repeating unit chain; e.g., poly(2-hydroxy-3-methacryloxypropyltrimethylammonium chloride and poly (dimethylaminoethyl methacrylate) salt. The cation modified poly(vinyl alcohol) is obtained by saponification of a copolymer of vinyl acetate and an ethylenically unsaturated monomer that has cationic groups.

JP 5-278323 (1993) discloses a recording sheet with good ink absorption, image quality, and water resistance, in which at least one side of a plastic film is covered with a recording layer produced by laminating a dye fixing layer and an ink absorption layer in that order. The principal components of the dye fixing layer are a quaternary ammonium salt polymer, a cation modified poly(vinyl alcohol), and a hydroxyl group crosslinkable compound, and the principal components of the ink absorption layer are a water-soluble macromolecule and a polymer obtained by grafting at least one compound having unsaturated bonds (e.g., vinyl esters, unsaturated carboxylic acid esters, and unsaturated carboxylic acid amides) to a polyester resin containing hydrophilic groups.

U.S. Pat. No. 5,270,103 (Oliver et al., 1993) discloses a receiver sheet which consists of a substrate and a coating containing a pigment and a binder. The binder comprises poly(vinyl alcohol) and an additional binder component; for example, a cationic polyamine, such as those of the type poly(2-hdyroxypropyl-1, 1-N-dimethyl ammonium chloride) which are relatively insensitive to pH variations compared to other cationic polyamines, or a cationic polyacrylamide. The receiver sheet is particularly useful for printing with aqueous based inks such as in ink jet printing systems.

BRIEF SUMMARY OF THE INVENTION

This invention relates to improved ink jet paper coatings. The improvement resides in the use of a coating applied to a paper substrate which imparts high optical density images and excellent water resistance by incorporating into the coating formulation a polymer having a plurality of pendent hydroxyl groups which has been graft polymerized with an amine functional monomer. The amine modified polymer is formed by post-modification of the hydroxyl containing polymer via aqueous free radical grafting with ethylenically unsaturated monomers containing primary, secondary, tertiary, or quaternary amine functionality. The present invention provides a single, one package, ink jet binder system which incorporates the dye fixative properties of cationic polymers with the high pigment binding power of poly(vinyl alcohol) based polymer systems.

There are several advantages to incorporating the above composition into ink jet paper coatings:

- an ability to prepare high quality ink jet recording paper with only one coating of the formulation;
- an ability to produce high quality ink jet paper which, when printed, gives high optical density images with regard to monochrome black, composite black, and primary colors;
- an ability to produce high quality ink jet paper which, when printed, yields waterfast images;
- an ability to produce high quality ink jet paper which when printed yields images with good lightfastness; and
- an ability to achieve fast ink dry times after printing onto ink jet paper coated with the above formulations.

The improved coated ink jet paper is prepared by:

- reacting an aqueous solution of a polymer having a plurality of pendent hydroxyl groups on the polymer chain with an ethylenically unsaturated monomer containing primary, secondary, tertiary, or quaternary amine functionality in the presence of persulfate initiator to obtain a grafted polymer solution;
- incorporating the grafted polymer solution, without additional processing of the grafted polymer solution, into a silica slurry;
- coating a paper substrate with the grafted polymer-silica slurry formulation; and
- drying the coated paper substrate.

BRIEF DESCRIPTION OF SEVERAL VIEWS OF THE DRAWINGS

Not applicable

DETAILED DESCRIPTION OF THE INVENTION

The improved ink jet recording paper according to the present invention has a coating applied thereon which contains a polymeric binder comprising a polymer having a plurality of pendent hydroxyl groups on the polymer chain with an amine functional ethylenically unsaturated monomer grafted thereon. One of the key findings contributing to the novelty of this invention is the superior performance achieved with an amine monomer grafted poly(vinyl alcohol) copolymer compared to various saponified vinyl acetate copolymers.

Representative amine functional monomers which can be employed for grafting onto the hydroxyl containing polymer, include monoalkylaminoalkyl methacrylate, monoalkylaminoalkyl acrylate, dialkylaminoalkyl methacrylate, trialkylammoniumalkyl methacrylate, trialkylammoniumalkyl acrylate, or dialkylaminoalkyl acrylate, or dialkylaminoalkyl (meth)acrylamides. The alkyl groups of the above cited functional monomers can be substituted or unsubstituted $C_1$ to $C_6$ alkyl groups. Examples of appropriate monomers are 2-(dimethylamino)ethyl methacrylate, 2-(diethylamino)ethyl methacrylate, 2-(dimethylamino) ethyl acrylate, 3-(dimethylamino)-2,2-dimethylpropyl acrylate, 2-(diethylamino)ethyl acrylate, 2-(tertiary-butylamino)ethyl methacrylate, 2-(trimethylammonium) ethyl methacrylate chloride, 2-(trimethylammonium)ethyl acrylate chloride, 3-(dimethylamino)propyl methacrylamide, methacrylamidopropyl trimethylammonium chloride, diallyldimethylammonium chloride, vinylpyridine, allylamine, or combinations thereof.

Polymers having a plurality of pendent hydroxyl groups can be formed by the polymerization of vinyl or acrylic esters in which the ester unit contains from 1 to 4 carbon atoms. The pendent ester groups, when hydrolyzed, form polymers containing pendent hydroxyl groups. A preferred class of polymers having a plurality of pendent hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. The mole percent of vinyl alcohol should be sufficient to enable free radical graft polymerization in an aqueous solution; i.e., render the polymer at least partially soluble in an aqueous medium. Typically the vinyl ester, specifically vinyl acetate, will comprise from 60 to 100 % of the copolymer, preferably at least 90 mole percent of the polymer. The poly(vinyl alcohol) used in this invention, generally, has a weight average molecular weight ($M_w$,) ranging from about 5,000 to 300,000, preferably 15,000 to 200,000. Attentively, the poly(vinyl alcohol) can have a degree of polymerization (Dp) of from 100 to 5000, preferably 200 to 3500. Poly(vinyl alcohol) is made commercially by the hydrolysis of poly(vinyl acetate) and typically has a hydrolysis level ranging from about 85% to greater than 99%. For this invention, the level of hydrolysis can range from 50% to 100%, preferably 75% to 98%. Mixed poly(vinyl alcohol) grades, using combinations of poly (vinyl alcohol)s varying in molecular weight and hydrolysis level, can also be employed in the present invention.

A variety of monomers may be copolymerized with a vinyl ester to produce polymers containing vinyl alcohol units. Monomers which can be polymerized with the vinyl ester, preferably vinyl acetate, include ethylene, unsaturated acids such as maleic, acrylic and methacrylic acid, and esters, such as the $C_1$, to $C_{12}$, preferably $C_1$, to $C_6$ alkyl esters of acrylic or methacrylic acid. In many instances, these polymers can be hydrolyzed to produce different grades of poly(vinyl alcohol) including, for example, hydrolyzing only the vinyl ester and leaving the acrylic ester functionality intact. Other monomers having from 2 to 12 carbon atoms such as alkyl maleates (e.g., dibutyl maleate and the like) may be polymerized as desired with vinyl acetate to control hydrophilic and hydrophobic content. Polymers which can be utilized in this invention are soluble in water.

The free radical grafting reaction can be conducted in homogeneous aqueous solutions at a temperature necessary to liberate free radicals for the graft polymerization. Typical temperatures range from 50 to 95° C., preferably 60 and 80° C. Reaction solids levels (ratio of poly(vinyl alcohol) to water) can vary from 5% to 40%, depending on the molecular weight of the poly(vinyl alcohol), preferably from 10% to 30%. Reaction times typically range from 1 to 5 hours. When amine functional acrylates or methacrylates are used for grafting to the poly(vinyl alcohol), the use of an equimolar amount of acid is preferred to reduce or eliminate the hydrolysis of the amino-ester moiety. Acceptable acids include acetic acid, hydrochloric acid, sulfuric acid, and the like. The grafting reaction can be conducted in a batch mode or in a semi-batch mode in which an aqueous solution of the amine functional monomer, with or without equimolar acid quantities, is added to a stirred solution of poly(vinyl alcohol) in water via delay feed. In the semi-batch mode, the initiator can also be added via a delay aqueous solution feed simultaneously with the monomer solution, or can be charged to the reactor in one portion prior to starting the monomer solution delay feed. Example of free radical initiators which can be employed in this grafting reaction include ammonium persulfate, sodium persulfate, potassium persulfate, tert-butylhydroperoxide, hydrogen peroxide and other good proton abstracters. Approximately 0.1 to 10 wt % (preferably 0.5 to 3.0 wt %) of the initiator, based on the amount of poly(vinyl alcohol), is used. High conversions of monomer to polymer have been observed in either batch or semi-batch process modes. It is preferable to continue the reaction until less than 0.5% of the amine functional monomer remains unreacted. Mole percent levels of amine functionalization, i.e., grafting of amine monomer, of the poly(vinyl alcohol) typically range from 0.5 to 70 mol %, preferably from 5 to 30 mol %.

The following table, Table 1, sets forth operative and preferred ranges regarding the use of amine functional monomer grafted poly(vinyl alcohol) in the ink jet coating of this invention:

TABLE 1

| | Operative Range | Preferred Range |
|---|---|---|
| Weight average molecular weight of poly(vinyl alcohol) | 5,000–300,000 | 15,000–200,000 |
| Acetate hydrolysis (mol %) | 50–100 | 75–98 |
| Amine content of grafted monomer (mol %) | 0.5–70 | 5–30 |
| Wt % binder in coating | 5–90 | 10–50 |
| Coating pH | 3–10 | 4–8 |

When the grafting reaction between the amine functional monomer and the poly(vinyl alcohol) is completed, the polymer solution can contain varying amounts of homopolymer of the amine functional monomer. The resulting polymer solution is used directly in formulating the ink jet paper coating without additional work-up or purification of the grafted polymer.

Ink jet coating formulations typically contain silica pigment having a surface area of 50 to 700 square meters per gram and possibly a small amount of another mineral pigment, such as aluminum silicate, clay, talc, calcium carbonate, magnesium silicate, and the like. The silica pigment is typically incorporated in the ink jet coating formulation in amounts ranging from about 1 to about 90 % by weight, preferably 30 to 85 % by weight. The polymeric binder level (solids basis) can range from 5 to 90 % by weight of the ink jet formulation; preferably 10 to 50 wt %.

The level of pigment and binder depend on the type of coater used in the preparation of the ink jet paper. For example a puddle size press application would use a low wt % of pigment relative to the binder due to viscosity limitations in comparison to an air knife coater where pigment to binder ratio would be greater. Ink jet formulations can also contain conventional additives such as defoamers, surface active agents, dyes, ultraviolet absorbents, pigment dispersants, mold inhibitors, thickeners and water-resisting agents.

The ink jet formulation is usually applied to the paper surface in amounts ranging from about 2 to 20 grams per square meter; preferably, 3 to 15 grams/square meter. Coat weight varies depending on the type of coating applicator. For example a puddle size press may only apply a coat weight of 2 to 4 grams per square meter whereas an air knife could provide up to 10 grams per square meter.

Although any kind of paper can be used for application of ink jet coatings of this invention, uncoated wood free paper is preferred.

Not intending to be bound by theory, it is believed the amine group in the amine functional polymers provides a cationic charge on the paper surface which reacts with the anionic sulfonic acid groups of the direct or acid dye of the ink jet inks to form an insoluble salt. As such, the inks become waterfast on the paper surface. Pigment binding strength is also improved with the use of amine functional poly(vinyl alcohol) due to the strong absorption of the amines with the silanol groups on the silica pigment.

The invention will be further clarified by a consideration of the following examples, which are intended to be purely exemplary of the invention.

EXAMPLE 1

Preparation of Poly(vinyl alcohol) Grafted with 10 Mole % 2-(Dimethylamino)ethyl Methacrylate (DMAEMA) via Semi-Batch Mode Airvol® 523 (200 g, DP~1200, 88% hydrolyzed) poly (vinyl alcohol) was dissolved in deionized water (1200 ml) by stirring at 80° C. for 1 hour. The reaction temperature was maintained at 80° C. and a solution consisting of ammonium persulfate (0.5 g) dissolved in water (20 ml) was added to the reactor in one portion. The following two solutions were then introduced into the reactor via delay feed: 1) a solution consisting of 63.0 g of 2-(dimethylamino)ethyl methacrylate, 24.0 g of acetic acid, and 150 ml of water was added over a 90-minute delay feed period, and 2) a solution of ammonium persulfate (4.0 g) and water (100 g) was added over a 120 minute delay feed period. Upon completing the delay feeds, stirring was continued at 80° C. for 2 hours. After cooling to room temperature, the resulting reaction mixture was used, without further work-up or purification, for formulating the paper coatings. High pressure liquid chromatography (HPLC) data revealed the presence of 4.8 wt % poly(DMAEMA) acetate homopolymer (max. theoretical homopolymer formation =31 wt %), suggesting that a majority (approximately 84 %) of the DMAEMA charged to the reactor is grafted to the poly(vinyl alcohol).

EXAMPLE 2

Preparation of Poly(vinyl alcohol) Grafted with 10 Mole % 2-(Dimethylamino)ethyl Methacrylate (DMAEMA) via Batch Mode Airvol® 523 (100 g, DP~1200, 88% hydrolyzed) poly (vinyl alcohol) was dissolved in deionized water (600 ml) by stirring at 80° C. for 1 hour. The reaction temperature was maintained at 80° C. and a solution consisting of 2-(dimethylamino)ethyl methacrylate (31.4 g), acetic acid (12.0 g), and water (75 ml) was added to the reactor in one portion. Subsequently, a solution consisting of ammonium persulfate (2.4 g) in water (60 ml) was added to the reactor in one portion and the resulting reaction mixture was stirred at 80° C. for 5 hours. After cooling to room temperature, the resulting reaction mixture was used without further work-up or purification for formulating the paper coatings. High pressure liquid chromatography (HPLC) data revealed the presence of 8.1 wt % poly(DMAEMA) acetate homopolymer, suggesting less (approximately 74%) of the DMAEMA charged to the reactor is grafted to the poly(vinyl alcohol) compared to the grafting reaction conducted under semi-batch reaction conditions (Example 1).

EXAMPLE 3

Semi-Batch Mode at Lower Temperature

The procedure of Example 1 was followed, but at a 60° C. graft polymerization temperature. High pressure liquid chromatography (HPLC) data revealed the presence of 5.0 wt % poly(DMAEMA) acetate homopolymer (max. theoretical homopolymer formation =31 wt %), suggesting that a majority (about 84%) of the DMAEMA charged to the reactor is grafted to the poly(vinyl alcohol).

EXAMPLE 4

Batch Mode at Lower Temperature

The procedure of Example 2 was followed, but at a 60° C. graft polymerization temperature. High pressure liquid chromatography (HPLC) data revealed the presence of 6.4 wt % poly(DMAEMA) acetate homopolymer (max. theoretical homopolymer formation =31 wt %), suggesting that a majority (approximately 79%) of the DMAEMA is grafted to the poly(vinyl alcohol), resulting in a polymer containing about 15 wt % DMAEMA. DMAEMA conversion times are significantly improved when the grafting reaction is run at this lower temperature. For example under batch conditions, >90% of the DMAEMA is converted to polymer after a 30 minute reaction time at 60° C., whereas it takes >5 hours to achieve the same conversion level at 80° C.

EXAMPLE 5

Preparation of Poly(vinyl alcohol) Grafted with 20 Mole % 2-(Dimethylamino)ethyl Methacrylate (DMAEMA) via Semi-Batch Mode Airvol® 523 (100 g, DP~1200, 88% hydrolyzed) poly(vinyl alcohol) was dissolved in deionized water (600 ml) by stirring at 80° C. for 1 hour. The reaction temperature was maintained at 80° C. and a solution consisting of ammonium persulfate (0.5 g) dissolved in water (10 ml) was added to the reactor in one portion. The following two solutions were then introduced into the reactor via delay feed: 1) a solution consisting of 63.0 g of 2-(dimethylamino)ethyl methacrylate, 24.0 g of acetic acid, and 150 ml of water was added over a 225-minute delay feed period, and 2) a solution of ammonium persulfate (4.1 g) and water (100 g) was added over a 245 minute delay feed period. Upon completing the delay feeds, stirring was continued at 80° C. for 2 hours. After cooling to room temperature, the resulting reaction mixture was used, without further work-up or purification of the grafted polymer, for formulating the paper coatings. High pressure liquid chromatography (HPLC) data revealed the presence of 15.0 wt % poly(DMAEMA) acetate homopolymer (max. theoretical homopolymer formation =46.5 wt %), suggesting that a majority (approximately 68%) of the DMAEMA charged to the reactor is grafted to the poly(vinyl alcohol).

EXAMPLE 6

Preparation of Poly(vinyl alcohol) Grafted with 4-Vinylpyridine

Airvol®523 (125 g, DP~1200, 88% hydrolyzed) poly (vinyl alcohol) was dissolved in deionized water (600 ml) by stirring at 80° C. for 1 hour. The reaction temperature was lowered to 70° C. and a solution consisting of 11.2 g of ammonium persulfate in 25 ml of water was introduced into the polymer solution in one portion. 4-Vinylpyridine (52.0 g) was then added to the reaction mixture over a 45 minute period. Upon completing this addition, the reaction mixture was stirred at 70° C. for 2 hours. During the course of this reaction the solution goes from being homogeneous to an emulsion. After cooling to room temperature, the resulting reaction mixture was used without further work-up or purification for formulating the paper coatings.

EXAMPLE 7

Ink Jet Coating Preparation

Sheets of uncoated base paper were coated for the purpose of evaluating ink jet optical density for several colors, waterfastness, and lightfastness. A paper coating dispersion was prepared by mixing 800 parts water, 100 parts silica pigment, and 40 parts (solids basis) of the poly(vinyl alcohol)-g-poly(DMAEMA) acetate copolymer, prepared as described in the above examples. In preparing the coatings, a dispersion of silica pigment in water was prepared first followed by the addition of poly(vinyl alcohol)-g-poly (DMAEMA) acetate aqueous solution to this dispersion under high shear. The resulting dispersion was coated onto uncoated wood free paper having a basis weight of 40 grams/square meter at a coat weight of 7–8 g/m$^2$, using a Meyer Rod draw down bar. After coating and drying at 250° F. for 60 seconds, the sheets were printed with a Hewlett Packard 560 ink jet printer using an HP test pattern distributed by Hewlett Packard for the purpose of testing ink jet paper media. After printing, the samples were measured for optical density using a Tobias IQ 200 Reflection Densitometer. The waterfastness test was performed by first measuring the monochrome black ink density after printing. The printed area was then immersed in distilled water for 30 seconds with slight agitation and dried on a hot plate under tension. The optical density was then measured again. Lightfastness was determined by measuring the optical density of ink jet printed paper before and after 70 hour UV light exposure.

Table 2 presents data on the ink optical density, water resistance, and light resistance of ink jet coatings containing amine functional monomer grafted poly(vinyl alcohol) binders and comparative examples utilizing a standard poly (vinyl alcohol) binder (sample 1), saponified vinyl acetate copolymer (sample 14), and a commercial cationic poly (vinyl alcohol) binder (sample 15).

TABLE 2

| | | Ink Optical Density | | | | | | |
|---|---|---|---|---|---|---|---|---|
| Sample | Polymeric Binder* | Monochrome Black | Magenta | Yellow | Cyan | Composite Black | Waterfast -ness[a] | Lightfast -ness[b] |
| 1 | Airvol ® 523 PVOH | 1.16 | 0.87 | 0.61 | 1.12 | 0.82 | 51.7 | 38.5 |
| 2 | PVOH/DMAEMA 10 mol % (9.5% I, semi-batch) | 1.24 | 0.82 | 0.54 | 1.1 | 0.85 | 0 | 46.6 |
| 3 | PVOH/DMAEMA 10 mol % (9.5% I, semi-batch) | 1.28 | 0.84 | 0.54 | 1.07 | 0.95 | 0 | nd |
| 4 | PVOH/DMAEMA 10 mol % (9.5% I, batch) | 1.2 | 0.76 | 0.5 | 0.99 | 0.8 | 0 | nd |
| 5 | PVOH/DMAEMA 10 mol % (1% I, semi-batch) | 1.20 | 0.82 | 0.57 | 1.11 | 0.84 | 9.2 | nd |
| 6 | PVOH/DMAEMA 10 mol % (0.5% I, semi-batch) | 1.18 | 0.81 | 0.59 | 1.07 | 0.81 | 11.0 | nd |
| 7 | PVOH/DMAEMA 10 mol % (1% I, batch) | 1.19 | 0.88 | 0.59 | 1.16 | 0.83 | 16.0 | nd |
| 8 | PVOH/DMAEA 10 mol % (1% I, semi-batch) | 1.10 | 0.88 | 0.62 | 1.22 | 0.72 | 20.9 | nd |
| 9 | PVOH/DMAEMA 5 mol % (semi-batch) | 1.23 | 0.86 | 0.55 | 1.15 | 0.82 | 8.1 | nd |
| 10 | PVOH/TMAEMA 10 mol % (5% I, semi-batch) | 1.36 | 0.90 | 0.64 | 1.14 | 0.92 | 0 | nd |
| 11 | PVOH/DMAPMAm 10 mol % (5% I, semi-batch) | 1.37 | 0.95 | 0.65 | 1.15 | 0.88 | 4.0 | nd |
| 12 | PVOH/DMAEMA 21 mol % (batch) | 1.35 | 0.88 | 0.54 | 1.05 | 0.95 | 0 | 50.5 |

TABLE 2-continued

| Sample | Polymeric Binder* | Ink Optical Density Mono-chrome Black | Magenta | Yellow | Cyan | Composite Black | Waterfast -ness[a] | Lightfast -ness[b] |
|---|---|---|---|---|---|---|---|---|
| 13 | PVOH/4-VP 20 mol % (semi-batch) | 1.09 | 0.74 | 0.56 | 1.0 | 0.81 | 0 | 61.6 |
| 14 | 4 mol % DMAPMAm-co-PVOH (saponified VAM/ DMAPAm copolymer) | 1.09 | 0.89 | 0.60 | 1.25 | 0.71 | 32.7 | nd |
| 15 | POVAL ® C-506 (cationic PVOH) | 1.23 | 0.95 | 0.64 | 1.23 | 0.9i | 45.5 | nd |

*Polymeric binder used to prepare the herein described ink jet coating formulation. mol % is the amount of amine monomer used in preparation of the graft copolymer. % I is the amount of initiator used in the free radical graft reaction.
PVOH : poly(vinyl alcohol)
DMAEMA: 2-(dimethylamino)ethyl methacrylate
DMAEA: 2-(dimethylamino)ethyl acrylate
TMAEMA: 2-(trimethylammonium)ethyl methacrylate
DMAPMAm: 3-(dimethylamino)propyl methacrylamide
4-VP: 4-Vinylpyridine
VAM: Vinyl acetate monomer
POVAL ® C-506: Cationic polyvinyl alcohol supplied by Kuraray
[a]Loss (%) of monochrome black ink optical density upon 30 second water soak.
[b]Total % ink loss (all colors) upon 71 hour UV irradiation.
nd: no data The results show that waterfastness is significantly improved with the use of several different amine functional monomer grafted poly(vinyl alcohol) compositions (samples 2–13) compared to poly(vinyl alcohol) alone (sample 1). All of the DMAEMA grafted poly(vinyl alcohol)s display substantially better, if not complete, waterfastness. Optical ink densities, in general, are maintained or improved in formulations of samples 2–13. It is interesting to note that the level of initiator used during the graft copolymerization of DMAEMA with poly(vinyl alcohol) appears to be important for ink jet performance. For example, there is better optical ink density and waterfastness for sample 3 compared to samples 5 and 6). Although ink density and lightfastness for sample 13 (vinyl pyridine grafted poly(vinyl alcohol)) are not as good as poly(vinyl alcohol) alone (sample 1), the print is completely waterfast. Samples 2–4, 10, and 12, in particular, show excellent ink optical density as well as exceptionally good waterfastness. Furthermore, the DMAEMA grafted poly(vinyl alcohol) materials (e.g., sample 3 and 9), are far superior in overall ink jet performance, particularly in waterfastness, when compared to a saponified vinyl acetate copolymer (sample 14) and a commercial cationic poly(vinyl alcohol) (sample 15).

What is claimed is:

1. A coated ink jet recording paper comprising a paper substrate coated with a formulation comprising a mineral pigment and an aqueous based polymeric binder comprising a graft polymer selected from the group consisting of poly(vinyl alcohol) grafted copolymers and vinyl alcohol copolymer grafted copolymers wherein said polyvinyl alcohol grafted copolymers are prepared by grafting an amine functional ethylenically unsaturated monomer onto polyvinyl alcohol and wherein said vinyl alcohol copolymer grafted copolymers are prepared by grafting an amine functional ethylenically unsaturated monomer onto vinyl alcohol copolymer wherein the amine functional ethylenically unsaturated monomer excludes dimethylaminoethyl methacrylate.

2. The coated ink jet recording paper of claim 1 wherein the mineral pigment is silica, and the graft polymer is poly(vinyl alcohol) grafted copolymer.

3. The coated ink jet recording paper of claim 2 wherein the amine functional ethylenically unsaturated monomer is selected from the group consisting of 2-(diethylamino)ethyl methacrylate, 2-(di-methylamino)ethyl acrylate, 3-(dimethylamino)-2,2-dimethylpropyl acrylate, 2-(diethylamino)ethyl acrylate, 2-(tertiary-butylamino)ethyl methacrylate, 2-(trimethyl-ammonium)ethyl methacrylate chloride, 2-(trimethylammonium)ethyl acrylate chloride, 3-(dimethylamino)propyl methacrylamide, vinylpyridine, allylamine, and combinations thereof.

4. The coated ink jet recording paper of claim 2 wherein the weight average molecular weight of the poly(vinyl alcohol) ranges from 15,000 to 200,000, the degree of hydrolysis of the poly(vinyl alcohol) ranges from 50 to 100 mol %, and the grafted copolymer contains 0.5 to 70 mol % amine functional monomer.

5. The coated ink jet recording paper of claim 2 wherein the weight average molecular weight of the poly(vinyl alcohol) ranges from 15,000 to 200,000, the degree of hydrolysis of the poly(vinyl alcohol) ranges from 75 to 98 mol %, and the grafted copolymer contains 5 to 30 mol % amine functional monomer.

6. The coated ink jet recording paper of claim 2 wherein the polymeric binder is present in an amount, on a solids basis, of 10 to 50 wt % of the formulation and the silica is present in an amount of 30 to 85 wt % of the formulation.

7. The coated ink jet recording paper comprising a paper substrate coated with a formulation comprising silica and an aqueous based poly(vinyl alcohol) grafted copolymer prepared from poly(vinyl alcohol) grafted with an amine functional ethylenically unsaturated monomer selected from the group consisting of 2-(diethylamino)ethyl methacrylate, 2-(dimethylamino)ethyl acrylate, 3-(dimethylamino)-2,2-dimethyl-propyl acrylate, 2-(diethylamino)ethyl acrylate), 2-(tertiary-butylamino)ethyl methacrylate, 2-(trimethylammonium)ethyl methacrylate chloride, 2-(trimethylammonium)ethyl acrylate chloride, 3-(dimethylamino)propyl methacrylamide, methacrylamidopropyl trimethylammonium chloride, diallyldimethylammonium chloride, vinylpyridine, allylamine, and combinations thereof.

8. The coated ink jet recording paper of claim 7 wherein the weight average molecular weight of the poly(vinyl alcohol) ranges from 15,000 to 200,000, the degree of hydrolysis of the poly(vinyl alcohol) ranges from 75 to 98 mol %, the grafted copolymer contains 5 to 30 mol % amine functional monomer and is present in an amount, on a solids basis, of 10 to 50 wt % of the formulation, and the silica is present in an amount of 30 to 85 wt % of the formulation.

9. A coated ink jet recording paper comprising a paper substrate coated with a formulation comprising a mineral pigment and an aqueous based polymeric binder comprising a graft copolymer prepared from a polymer having a plurality of pendent hydroxyl groups by way of free radical grafting of said polymer with an amine functional ethylenically unsaturated monomer having primary, secondary, tertiary or quaternary amine groups wherein the amine functional ethylenically unsaturated monomer excludes dimethylaminoethyl methacrylate.

10. The coated ink jet recording paper of claim 9 wherein the mineral pigment is silica and the polymer having a plurality of pendent hydroxyl groups is poly(vinyl alcohol).

11. The coated ink jet recording paper of claim 10 wherein the amine functional monomer is selected from the group consisting of 2-(diethylamino)ethyl methacrylate, 2-(dimethylamino)ethyl acrylate, 3-(dimethylamino)-2,2-dimethylpropyl acrylate, 2-(diethylamino)ethyl acrylate, 2-(tertiary-butylamino)ethyl methacrylate, 2-(trimethylammonium) ethyl methacrylate chloride, 2-(trimethylammonium)ethyl acrylate chloride, 3-(dimethylamino)propyl methacrylamide, vinylpyridine, allylamine, and combinations thereof.

12. The coated ink jet recording paper of claim 10 wherein the weight average molecular weight of the poly(vinyl alcohol) ranges from 15,000 to 200,000, the degree of hydrolysis of the poly(vinyl alcohol) ranges from 50 to 100 mol %, and the grafted copolymer contains 0.5 to 70 mol % amine functional monomer.

13. The coated ink jet recording paper of claim 10 wherein the weight average molecular weight of the poly(vinyl alcohol) ranges from 15,000 to 200,000, the degree of hydrolysis of the poly(vinyl alcohol) ranges from 75 to 98 mol %, and the grafted copolymer contains 5 to 30 mol % amine functional monomer.

14. The coated ink jet recording paper of claim 10 wherein the polymeric binder is present in an amount, on a solids basis, of 10 to 50 mol % of the formulation and the silica is present in an amount of 30 to 85 wt % of the formulation.

* * * * *